United States Patent Office 2,799,615
Patented July 16, 1957

2,799,615

PROCESS OF PREPARING FUNGICIDAL 8-HYDROXYQUINOLINE COMPOSITIONS

Albrecht Heymons, Berlin-Nikolassee, and Willy Schnabel, Berlin-Schoneberg, Germany, assignors to Riedel-de Haen Aktiengesellschaft, Seelze, near Hannover, Germany No Drawing. Application September 22, 1953, Serial No. 381,728

Claims priority, application Germany May 23, 1953

2 Claims. (Cl. 167—33)

This invention relates to a process of preparing fungicidal compositions.

The fungicidal activity of metal compounds of hydroxyquinoline, i. e. so-called metal-hydroxyquinolinates, is known.

The preparation of soluble or emulsifiable compositions containing metal-hydroxyquinolinates normally involves great difficulty because of the extreme insolubility of the latter compounds in ordinary solvents. Even the preparation of stable dispersions from these hydroxyquinolinates and suitable dispersion agents is not possible except under special conditions. In order to prepare stable dispersions of metal-hydroxyquinolinates, it has been proposed, for example, to separately prepare same, to initially isolate the compounds and then to convert them into finely divided particles by using suitable milling equipment. Hydroxyquinolinates thus treated were then dispersed in oils or like media using suitable stabilizing additions or agents.

The preparation of solutions or emulsions containing metal-hydroxyquinolinates involves even greater difficulties than the foregoing. It has been recently determined that solutions or emulsions may be obtained containing conversion products of metal-hydroxyquinolinates which have not been previously identified, if certain metal-hydroxyquinolinates and certain metal soaps, i. e. metal salts of unsaturated higher fatty acids, are subjected to reaction at high temperatures, which are generally close to the point of decomposition of the components, the reaction product then being mixed with suitable solvents.

It is also known to react metal-hydroxyquinolinates with phenols at relatively high temperatures and to prepare solutions, emulsions or dispersions from the resulting products.

All of the previous methods are characterized by the fact that one uses as starting material finally prepared metal-hydroxyquinolinates and attempts afterwards to make them soluble or dispersible. The metal-hydroxyquinolinates must, therefore, be first obtained in a separate operation. Moreover, the previous methods have the disadvantage that the reactions for obtaining solutions or dispersions must be carried out at extremely high temperatures.

It is, therefore, one of the objects of the present invention to provide means affording the preparation of fungicidal and like compositions from readily available starting or base materials in a very efficient and rapid manner, substantially at room temperature or slightly elevated temperatures up to 90° C. and at reduced operational cost in regard to labor, equipment and material.

It is another object of the present invention to provide means conducive to marked efficiency in the operation of carrying out the process of the present invention for preparing fungicidal compositions.

Still a further object of the present invention is to provide means materially reducing the cost of manufacture by carrying out the process of the invention on an industrial scale and on a very economical basis, thereby enhancing the saleable and commercial possibilities of the fungicidal preparation thus obtained.

Yet another object of the present invention is to provide means contributing to considerable improvements in regard to the stability of the preparation in storage, solubility thereof and its capability of being mixed with additional fungicidal and like agents to thereby vary and enlarge the usefulness of the end product thus attained.

The present invention deals with the preparation of fungicidal compositions containing metal-hydroxyquinolinates, which are obtained unexpectedly and in a simple manner in a form of solutions or dispersions capable of being diluted by subjecting free hydroxyquinolines or derivatives thereof, particularly 8-hydroxyquinoline, either per se or in solution to the action of solutions or even suspensions of metal compounds in organic solvents which are not miscible with water, at room temperature or only at a temperature slightly thereabove up to about 90° C. and, if desired, together with the customary additive agents employed in the preparation of fungicidal agents.

The preparation of fungicidal compositions takes place according to the process of the present invention in the simplest manner since the metal compound or the mixture of metal compounds dissolved in a solvent which is not miscible with water, is added to the hydroxyquinoline, particularly 8-hydroxyquinoline, which may be in the form of a solution, if desired, approximately at room temperature. It is also possible to carry out the reaction at higher temperatures, for example, the hydroxyquinoline may be subjected to the action of hot solutions of metal compounds.

Generally, it is possible to let the temperature of the starting components remain unaltered.

In addition to pure 8-hydroxyquinoline, mixtures of hydroxyquinolines consisting of 8-, 5-, 6- and 7- hydroxyquinoline may be employed. The invention also contemplates the use of alkylated or halogenated hydroxyquinoline derivatives. If it is desired to obtain the hydroxyquinolinates in the form of dispersions by a suitable choice of the metal compounds to be employed as starting material, stabilizing agents are advantageously added to the starting solutions in order to protect the metal-hydroxyquinolinates in their nascent condition from agglomeration into larger particles and precipitation. However, even without the addition of auxiliary agents, the process of the present invention may be employed for the preparation in a particularly simple manner of stable dispersions and, of especially practical significance, stable solutions capable of being diluted and suitable for the preparation of emulsions. Benzene, petroleum hydrocarbons and other hydrocarbons having similar physical and chemical properties may be employed as diluents.

As starting materials for the reaction with hydroxyquinolines, solutions of complex metal compounds, and preferably compounds having a metal linked to an ionic organic radical, in solvents which are not miscible with water are suitable, the metal compounds being employed either singly or in admixture with one another. Metal compounds particularly suitable for the purposes of the invention are compounds of copper, iron, cobalt, nickel, chromium, mercury, zinc, manganese, calcium, barium, aluminum and cadmium. These metal compounds are either metal salts of organic acids or complex metal compounds of certain organic carbonyl compounds, for example, metal compounds of aromatic hydroxyaldehydes and hydroxyketones or 1,3-diketones. The following are examples of metal compounds which may be employed: copper stearate, iron-, cobalt- or nickel oleate, arylmercuric oleate, nickel compounds of salicylaldehyde, copper compounds of acetyl acetone.

As solvents for the metal compounds which serve as starting materials, organic liquids which are not miscible with water are employed, particularly pyridines, quinolines, aromatic hydrocarbons, higher and preferably unsaturated fatty acids or phenols. These solvents must be capable of dissolving the organic metal compounds which are utilized as starting materials and are also capable of bringing hydroxyquinolines in solution.

In special cases suspensions of the metal compounds may be employed instead of solutions, particularly when the hydroxyquinolinates to be prepared are soluble in the solvents utilized, which solvents are not miscible with water. For example, hydroxyquinoline may be subjected to the action of a suspension of phenylmercuric hydroxide in a solution of nickel oleate in benzene, thereby obtaining a stable solution.

According to a modification of the process of the present invention, stable solutions which may be readily diluted are obtained by subjecting hydroxyquinolines, particularly 8-hydroxyquinoline, to the action of solutions of copper and nickel salts, and, if desired, of mercury salts of organic acids in solvents consisting of higher unsaturated fatty acids, the reaction being carried out at room temperature or at moderately elevated temperature.

According to a further modification of the process of the present invention, hydroxyquinolines, and particularly 8-hydroxyquinoline, may be subjected to the action of solutions of metal compounds in higher unsaturated fatty acids, such metal compounds being preferably copper and nickel compounds of hydroxyaldehydes, hydroxyketones or 1,3-diketones and especially aromatic hydroxyaldehydes, such as chlorsalicylaldehyde or methoxy-salicylaldehyde. In this manner fungicidal agents capable of a particularly wide latitude of application are obtained.

Depending upon the purpose for which the fungicidal preparations are to be employed, it is possible to add to the solutions or dispersions of the latter additional fungicidal agents (such as pentachlorophenol), insecticidal agents (such as dichlorodiphenyltrichloroethane), waterproofing agents (such as aluminum stearate), and flameproofing agents (such as polyhalogenated hydrocarbons).

In contra-distinction to known methods, the process of the present invention has the advantage that the metal-hydroxyquinolinates are produced directly in the fungicidal preparations. Consequently, the necessity of a separate process step for preparation of the hydroxyquinolinates is eliminated. A considerable technical improvement results from the fact that the process of the present invention may be carried out at lower temperature, and preferably at room temperature, or at slightly elevated temperatures up to about 90° C.

Example 1

5.5 g. of the copper salt of methoxysalicylaldehyde and 6 g. of the nickel salt of methoxysalicylaldehyde are dissolved in 120 g. of technical quinoline while stirring and using mild heat. After cooling to room temperature, 4.1 g. of 8-hydroxyquinoline are added and stirring is continued for a short time. A clear solution is obtained which may be diluted with benzene, as desired.

Example 2

3.7 g. of phenylmercuric hydroxide and 1.8 g. of 8-hydroxyquinoline are added to a solution of 2 g. of nickel oleate in 100 g. of benzene at room temperature. After stirring for approximately ten minutes, a clear solution is obtained.

Example 3

A solution of 18 g. of copper oleate and 18 g. of nickel oleate in 114 g. of benzene and a second solution of 4.1 g. of 8-hydroxyquinoline in a mixture of 28 g. of benzene and 18 g. of oleic acid are prepared. Both solutions are mixed together at room temperature. A clear solution is obtained which may be emulsified in water after addition of an emulsifier.

Example 4

8.2 g. of 8-hydroxyquinoline are added to a solution of 35 g. of cobalt oleate and 35 g. of copper oleate in 35–40 g. of oleic acid at 75° C. A clear solution is obtained which may be diluted, as desired, with petroleum hydrocarbons or benzene.

Example 5

100 g. of m-cresol are heated to 50–60° C. and 3.3 g. of basic copper carbonate are added. 8.2 g. of 8-hydroxyquinoline are added with stirring. After stirring for approximately ten minutes all of the ingredients are dissolved. The clear solution may be diluted, as desired, with aliphatic or aromatic hydrocarbons.

Example 6

To a solution of 18 g. of nickel oleate and 9 g. of copper oleate in 70 g. of paraffin oil at 75° C., 4.1 g. of 8-hydroxyquinoline are added and the solution diluted with 100 cc. of benzene. The resulting hydroxyquinolinate is partly dissolved and partly suspended in finely divided form in the solution.

Example 7

8.2 g. of 8-hydroxyquinoline are added at 75° C. to a solution of 38 g. of cadmium oleate and 35 g. of copper oleate in 35–40 g. of oleic acid with stirring. A clear solution is obtained which may be diluted with petroleum hydrocarbons or benzene.

It is obvious that various changes may be made in the details of the process without departing from the spirit of this invention, and it is therefore to be understood that this invention is not to be limited to the specific details described.

Having thus described the invention, what is claimed as new and desired to be secured by Letters Patent, is:

1. The process of preparing a fungicidal composition, comprising the step of reacting at substantially room temperature a first solution of about 3 parts by weight copper oleate and about 3 parts by weight nickel oleate in about 19 parts by weight benzene with a second solution of about 1 part by weight 8-hydroxyquinoline in a mixture of about 7 parts by weight benzene and about 4.5 parts by weight oleic acid, to thereby form said composition.

2. The process of preparing a fungicidal composition, comprising the step of mixing at substantially room temperature a first solution of copper oleate and nickel oleate in benzene with a second solution of 8-hydroxyquinoline in a mixture of benzene and oleic acid, whereby the components of said first and second solutions react to form said composition.

References Cited in the file of this patent
UNITED STATES PATENTS

| Number | Name | Date |
|---|---|---|
| 2,085,065 | Andersen | June 29, 1939 |
| 2,561,380 | Kalberg | July 24, 1951 |
| 2,649,451 | Wheatley | Aug. 18, 1953 |
| 2,769,006 | Kalberg | Oct. 30, 1956 |
| 2,770,626 | Nicholson | Nov. 13, 1956 |